Oct. 13, 1959 R. D. CAMPBELL 2,908,865
FREQUENCY MEASURING APPARATUS
Filed May 2, 1956
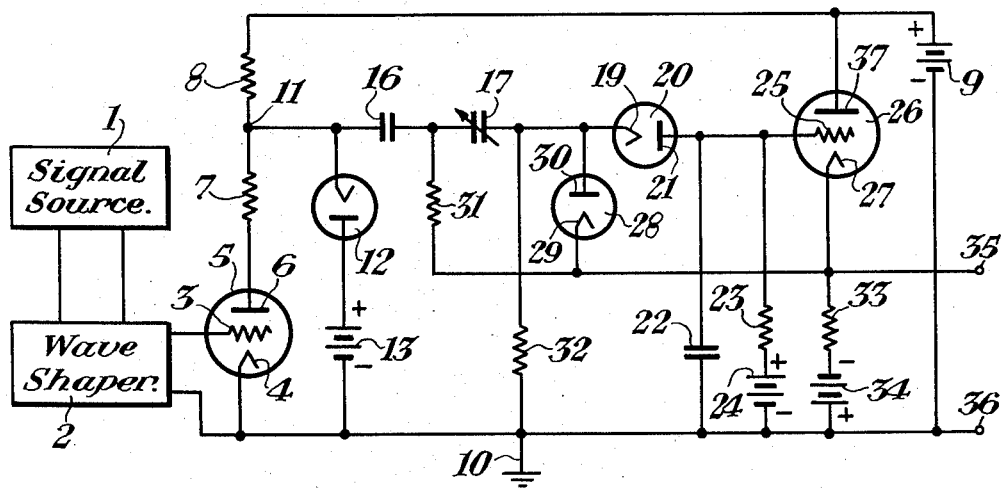
INVENTOR.
Richard D. Campbell.
BY W. L. Stout
HIS ATTORNEY

United States Patent Office 2,908,865
Patented Oct. 13, 1959

2,908,865

FREQUENCY MEASURING APPARATUS

Richard D. Campbell, Harmarville, Pa., assignor to Westinghouse Air Brake Company, Wilmerding, Pa., a corporation of Pennsylvania Application May 2, 1956, Serial No. 582,248

2 Claims. (Cl. 324—78)

This invention relates to a frequency measuring means and more particularly to a means for providing a linear transformation between the measured frequency and a voltage that is the analog of the frequency.

In analog computing systems, variable input quantities are frequently represented with voltages. This necessitates a means for converting a variable input quantity, which may be in the form of speed, rotation or frequency, etc., to a voltage representative of the input quantity. Usually it is desirable to employ apparatus that will provide a linear transformation between the variable input quantity and the voltage representative of the quantity since severe calibration problems encountered when non-linear transformation devices are employed. This condition exists in systems employing frequency measuring apparatus for providing a conversion between a variable frequency and a voltage representative of the frequency as most frequency measuring systems that function over a fairly wide band of frequencies, including very low frequencies, are usually non-linear.

It is, therefore, an object of the present invention to provide a frequency measuring means suitable for use in connection with analog computing systems.

A further object of the present invention is to provide a frequency measuring means that provides a linear transformation between the measured frequency and a voltage representative of the frequency.

Another object of the invention is to provide a frequency measuring means that will give the same output indication when no signal is applied to its input terminals as when the frequency of the measured signal is zero.

In accordance with my invention the signal having a frequency to be measured is passed through wave shaping means and a voltage limiting network to provide a signal with upper and lower voltage limits which cannot be exceeded. The resulting signal is used to change the charge of a capacitor in discrete steps for each cycle of the measured frequency. Obviously, the higher the frequency the greater will be the charge removed per unit length of time. Simultaneously, the charge is restored at a predetermined rate. Therefore, for each frequency measured, there is an equilibrium condition at which the charge removed per unit length of time is equal to the charge restored per unit length of time. This establishes a voltage across the capacitor that is a measure of the measured frequency.

Other objects of my invention and features of novelty thereof will be apparent from the following description taken in connection with the accompanying drawing.

The accompanying drawing is a diagrammatic view showing one form of frequency measuring apparatus embodying my invention.

Referring now to the drawing, I have here shown a signal source 1 that provides a signal having a frequency to be measured. The signal is impressed on a wave shaper 2 of well known construction. The wave shaper functions to limit the amplitude of the positive and negative half cycles of the signal from the source 1 and to thereby provide a signal with a substantially square wave form.

The signal from the wave shaping circuit is impressed between a grid 3 and a cathode 4 of a suitable vacuum tube 5, here shown as a triode. Anode 6 of this tube is connected through two resistors 7 and 8, connected in series, to the positive terminal of a battery 9. The cathode of tube 5 and the negative terminal of battery 9 are connected to a common ground point 10.

Each of the energy sources contained in the drawing are shown as battery sources. However, it is to be understood that the battery sources may be replaced with a suitable source of alternating current energy operating in connection with a suitable rectifying means.

The junction 11 of resistors 7 and 8 is connected to a clamping circuit comprising diode 12 and a battery 13. The clamping circuit acts in connection with the vacuum tube 5 to limit the excursions of the voltage at junction 11. That is, these components provide an upper and lower limit for the voltage between the junction point and ground that cannot be exceeded. The input signal to tube 5 should be of sufficient magnitude to cause this voltage to vary between these limits during the successive cycles of the input signal.

During the positive half cycles of the input signal to tube 5, the grid is driven positive with respect to the cathode. This causes the tube to conduct a relatively high current and causes the voltage across resistors 7 and 8 to increase and the voltage between junction 11 and ground to decrease. This voltage can only decrease until it drops slightly below that of battery 13. Any tendency for the voltage to drop further provides a forward bias on diode 12 which causes the diode to conduct. This restores this voltage to substantially the voltage of battery 13 and thereby establishes a lower limit that cannot be exceeded.

During the negative half cycles of the input signal, the anode current of tube 5 is reduced to zero. This prevents any current from flowing through resistors 7 and 8 and the voltage between junction 11 and ground rises to the potential of battery 9. This establishes an upper limit for the voltage that cannot be exceeded. It is thus seen that the excursions of the voltage between junction 11 and ground are confined to voltages between that of battery 13 and that of battery 9.

A pair of capacitors 16 and 17 are connected between the junction 11 and cathode 19 of a first diode 20. Anode 21 of the diode 20 is connected to ground through a parallel circuit comprising capacitor 22 in one branch and a resistor 23 in series with a battery 24 in a second branch. This anode is further connected to grid 25 of vacuum tube 26. Cathode 27 of tube 26 is connected through a second diode 28 to the cathode of the first diode. Cathode 29 of the second diode is connected to the cathode of tube 26 while the anode 30 is connected to the cathode of the first diode. A resistor 31 is connected between cathode 29 of the second diode and the junction of capacitors 16 and 17. A resistor 32 is connected between the cathode 19 of the first diode and ground.

Capacitor 16 and resistor 31 provide isolation between the direct current potential of junction 11 and the diode circuits. This has a two fold advantage. First, it lowers the voltage stress on capacitor 17 and, in turn, the leakage current through the capacitor. Inasmuch as this leakage current is detrimental to the accuracy of the measuring circuit, this permits capacitors to be used that are more readily attainable than could be employed if the isolation network is not used. Secondly, it causes the output indication from the measuring means to be the same when a signal of zero frequency is applied as when no signal is applied.

Resistor 32 controls the charge on capacitor 17 in such manner that the output indication varies linearly with the measured frequency. This linearity is maintained over a wide band of frequencies including very low frequencies, of the order of 20 cycles per second. This is advantageous in that it permits the output indication to be related to the measured frequency with a scale factor that is independent of the measured frequency.

The charge and, in turn, the voltage on capacitor 22 is controlled by the measured frequency in the following manner. When no signal, or a signal of zero frequency, is applied to the frequency measuring circuit, the voltage across capacitor 22 is substantially equal to the voltage between the cathode 27 of tube 26 and ground. This is brought about by the action of diodes 20 and 28. That is, current flows from the source 24 through resistor 23, diodes 20 and 28, resistor 33, source 34 and back to the source 24 until the voltage between the grid 25 of tube 26 and ground is substantially equal to the voltage between the cathode 27 and ground. This reduces the voltage across the diodes to substantially zero. Hence, no further current flows through the diodes and capacitor 22 is provided with a voltage equal to the voltage between the cathode of tube 26 and ground.

The capacitor remains charged in this manner until an alternating current signal is applied to the measuring circuit. The application of such a signal causes the circuit to operate as follows. During each half cycle, when the potential of junction 11 decreases below its operating level, diode 20 is biased positively to provide current conduction which reduces the voltage across the capacitor 22. During each subsequent half cycle, charging current from source 24 flows through resistor 23 to tend to replenish the charge removed during the previous half cycle. However, before the charge is fully replenished the following half cycle will cause an additional charge to be removed from the capacitor. This action continues until the decrease in the charge during one half cycle of the measured frequency is substantially equal to the charge replenished by battery 24 through resistor 23 during each subsequent half cycle. Therefore, there is a unique voltage that appears across the capacitor 22 for each frequency to be measured.

The voltage that is representative of the measured frequency appears at the output terminals 35 and 36. The voltage across capacitor 22 is coupled to the output terminals through the cathode follower amplifier comprising tube 26 and its associated circuitry. The cathode of this tube is connected to ground through resistor 33 in series with the voltage source 34. The voltage source 34 is connected so as to make the cathode negative with respect to ground. Anode 37 of tube 26 is connected to the positive terminals of battery 9 and is thereby provided with a suitable operating voltage. The cathode follower amplifying means isolates the output circuit from capacitor 22 and thereby prevents any circuitry that may be connected to the output terminals from loading the frequency measuring circuit.

Although I have herein shown and described only one form of apparatus embodying my invention, it is to be understood that various changes and modifications may be made therein within the scope of the appended claims without departing from the spirit and scope of my invention.

Having thus described my invention, what I claim is:

1. Apparatus for measuring the frequency of incoming signals comprising in combination, a capacitor, a first source of direct current energy, a first resistor connected in series with said capacitor and said first source of direct current energy, amplifying means including an anode, a grid and a cathode, one terminal of said capacitor being connected to the grid of said amplifying means and the other terminal of said capacitor being connected to ground reference, said first source of direct current energy having its positive terminal connected through said first resistor to said grid and its negative terminal connected to ground reference, a second resistor having one terminal connected to the cathode of said amplifying means, a second source of direct current energy having its negative terminal connected to the other terminal of said second resistance and its positive terminal to ground reference, a pair of diode rectifiers having positive and negative electrodes, the positive electrode of the first of said diodes being connected to the grid of said amplifying means, the negative electrode of said first diode being connected to the positive electrode of said second diode, the negative electrode of said first diode being connected such that the incoming signals are impressed thereon, the negative electrode of said second diode being connected to the cathode of said amplifying means, said first source of direct current energy charging said capacitor at a predetermined rate through a circuit including said first resistor, said first and second diodes, said second resistor and said second source of direct current energy until the potential between the grid and said cathode of said amplifying means is substantially zero, a linearizing resistor having one terminal connected to the negative electrode of said first diode, the other terminal of said linearizing resistor being connected to ground reference, said capacitor being discharged by said incoming signals through said first diode and said linearizing resistor at a substantially linear rate in accordance with the frequency of said signals, and means connecting an output voltage from the cathode of said amplifying device which voltage is proportional to the frequency of said incoming signals.

2. Apparatus for measuring the frequency of incoming signals comprising in combination, means shaping said signals to substantially square wave-form, first signal amplifying means connected to said wave-shaping means, a signal-clamping network connected to said amplifying means, a capacitor, a first source of direct current energy, a first resistor connected in series with said capacitor and said first source of direct current energy, second amplifying means including an anode, a grid and a cathode, one terminal of said capacitor being connected to the grid of said second amplifying means and the other terminal of said capacitor being connected to ground reference, said first source of direct current energy having its positive terminal connected through said first resistor to said grid and its negative terminal connected to ground reference, a second resistor having one terminal connected to the cathode of said second amplifying means, a second source of direct current energy having its negative terminal connected to the other terminal of said second resistance and its positive terminal to ground reference, a pair of diode rectifiers having positive and negative electrodes, said diodes being being connected between said capacitor and the output circuit of said first amplifying means, the positive electrode of the first of said diodes being connected to the grid of said second amplifying means, the negative electrode of said first diode connected to the positive electrode of said second diode and said incoming signal being impressed thereon, the negative electrode of said second diode being connected to the cathode of said second amplifying means, means isolating said diodes from the input potential for providing a zero output when no signal is applied to said apparatus, said first source of energy charging said capacitor at a predetermined rate through a circuit including said first resistor, said first and second diodes, said second resistor and said second source of direct current energy until the potential between the grid and said cathode of said second amplifying means is substanttially zero, a linearizing resistor having one terminal connected to the negative electrode of said first diode, the other terminal of said linearizing resistor being connected to ground reference, said capacitor being discharged by said incoming signals through said first diode and said linearizing resistor at a substantially linear rate in accordance with the frequency of said signals, and means connecting an output voltage from the cathode of said second amplifying device which voltage is proportional to the frequency of said incoming signals.

References Cited in the file of this patent

UNITED STATES PATENTS

| | | |
|---|---|---|
| 2,218,642 | Hathaway | Oct. 22, 1940 |
| 2,307,316 | Wolff | Jan. 5, 1943 |
| 2,403,557 | Sanders | July 9, 1946 |
| 2,555,865 | Warren | June 5, 1951 |
| 2,629,008 | Lynch | Feb. 17, 1953 |
| 2,755,380 | Laverty | July 17, 1956 |

OTHER REFERENCES

"Frequency Meter," article in Electronics World, February 1952, pages 25–27.